April 24, 1951     C. E. SWALWELL     2,550,172
CLOTHES CARRIER FOR AUTOMOBILES
Filed Aug. 14, 1947
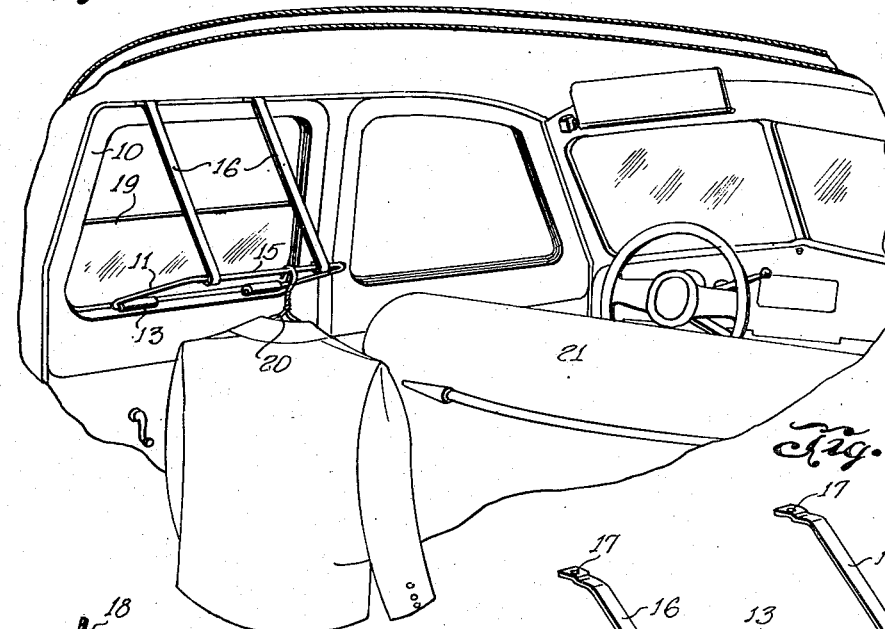
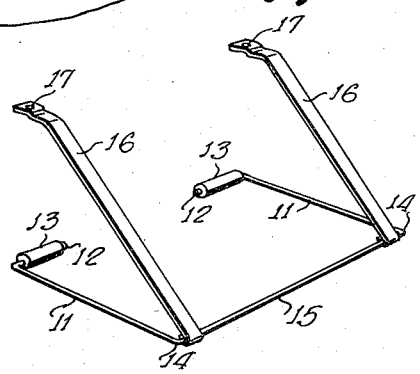
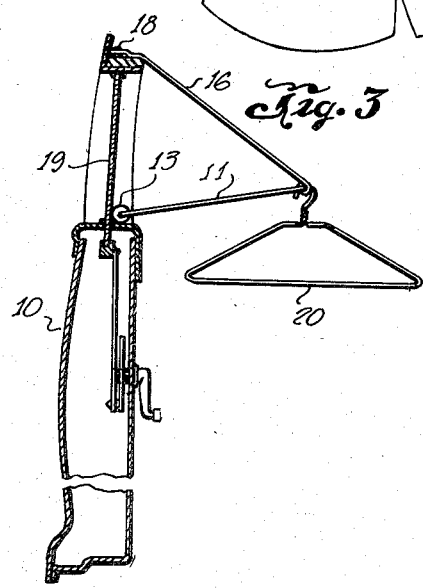
Clyde E. Swalwell
INVENTOR.
ATTORNEY Patented Apr. 24, 1951

2,550,172

UNITED STATES PATENT OFFICE 2,550,172

CLOTHES CARRIER FOR AUTOMOBILES

Clyde E. Swalwell, Dallas, Tex.

Application August 14, 1947, Serial No. 768,526

1 Claim. (Cl. 224—42.45)

This invention relates to garment hangers and more particularly to garment hangers or carriers as attachments to automobiles.

The principal object of the invention is to provide a garment carrier or hanger support constructed of a minimum number of parts and designed for convenient installation on the door or roof of an automobile so that the hangers mounted thereon will support garments between the front and rear seats, in which position the garments are out of the way and are protected against wrinkling, disarray and from becoming soiled by contact with other objects in the vehicle.

Another object of the invention is to provide a simple and expedient means for transporting wearing apparel by tourists, apparel salesmen and others, which will keep the garments in wearable condition, obviating the necessity of pressing before wearing or displaying which would be required if the garments were transported in suitcases in a conventional manner.

Still another object of the invention is to provide a clothes carrier whose novel construction lends itself to many forms of mounting, that is to say, it may be mounted in the top of a vehicle, to the back of the front seat or on either or both rear doors in the case of a four door automobile or an each of the doors of a sedan coach, the door mounting being preferred because of the accessibility of the garments when the door is opened. In any case however, provision may be made to adjust the carrier to operative and inoperative positions if it is desired to retract the hanger when not in use.

With the foregoing objects in view, the invention has further reference to certain features of accomplishment which will become apparent as the description proceeds, taken in connection with the accompanying drawing wherein:

Figure 1 is a fragmentary perspective view of the interior of a vehicle showing a preferred embodiment of the invention installed therein.

Figure 2 is a perspective view of the invention per se, and

Figure 3 is a vertical sectional view of an automobile door showing the invention mounted thereon.

Continuing with a more detailed description of the drawing, reference numeral 10 denotes the door of a vehicle, preferably the rear door of a sedan or coach type automobile which affords a better accommodation for the invention than a coupe or one seat automobile from the standpoint of space.

In Figures 1 to 3 inclusive is shown a garment carrier or hanger support consisting of a substantially U-shaped horizontally disposed frame 11, the extremities 12 of the legs thereof being disposed in confronting relationship, as shown, and on each of which is mounted a rubber sleeve 13. Adjacent each of the right angular bends 14 of the transverse member 15 of the frame 11 is attached the lower end of an angularly disposed supporting strap or brace 16, the upper end of each of these straps being shaped to conform with the top of the door 10 and apertured at 17 to receive a screw 18 which is driven into the door to secure the brace 16.

When in position on the door 10, the garment carrier is so disposed that the legs 11 of the frame are perpendicular to the plane of the glass 19 of the door and the rubber sleeves 13 bear against the glass to support the frame in horizontal position or nearly so but will offer no resistance to the raising or lowering of the glass, it being understood, of course, that to afford a support for the frame, the glass must not be fully lowered.

The transverse member 15 of the frame 11 lies in parallelism with the door 10 and well into the space between the front and rear seats of the automobile. Garment hangers 20 mounted on the frame member 15 are parallel with the back of the front seat 21 and being so disposed, a considerable number of these hangers supporting garments may be carried by the frame without interfering with the opening and closing movements of the door 10.

In any case, the carrier affords an expedient means for conveying wearing apparel and other articles so that they will be at all times ready for use or, in case of salesmen's samples, they will present a neat appearance on display without need for pressing.

Manifestly, the construction as shown and described is capable of some modification and such modification as may be construed to fall within the scope and meaning of the appended claim is also considered to be within the spirit and intent of the invention.

What is claimed is:

In a garment carrier adapted for attachment to an automobile door, the combination comprising a substantially U-shaped garment hanger supporting frame having its ends turned into confronting relationship to define supports for said frame adapted to bear against the glass of said automobile door, a rubber sleeve embracing each of said supports, a metal strap attached at its lower end to each corner of said frame, said straps extending angularly upward and engaging over the top of said door and means for affixing the upper ends of said straps to said door to support the outer end of said frame.

CLYDE E. SWALWELL.

REFERENCES CITED

The following references are of record in the file of this patent:

UNITED STATES PATENTS

| Number | Name | Date |
| --- | --- | --- |
| 2,157,001 | Morley | May 2, 1939 |
| 2,196,341 | Rush | Apr. 9, 1940 |
| 2,346,276 | Reittinger | Apr. 11, 1944 |
| 2,461,722 | Coons | Feb. 15, 1949 |